May 29, 1956     F. C. MELCHIOR     2,748,217
ALTITUDE SWITCH
Filed Aug. 2, 1951     2 Sheets-Sheet 1
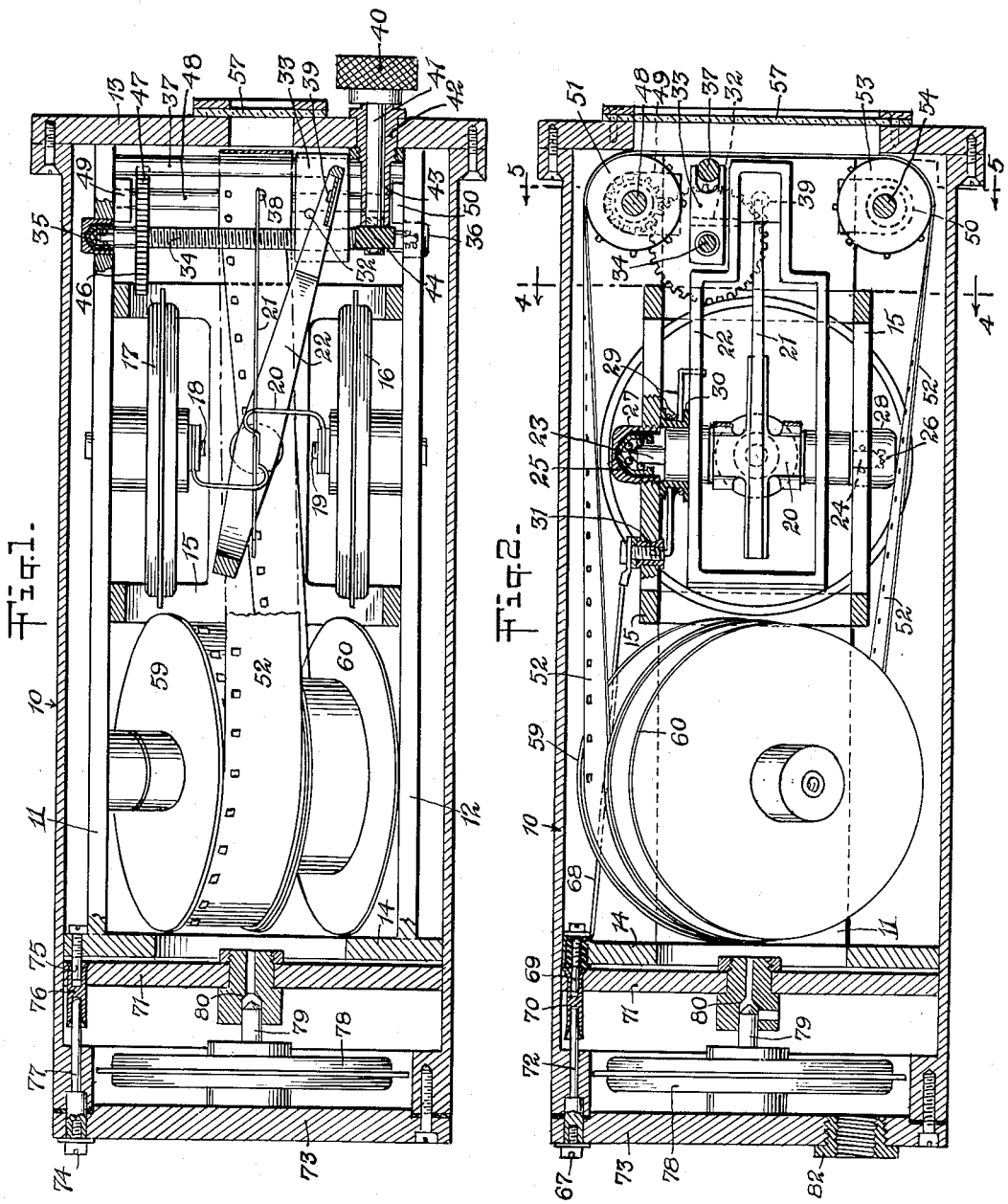
INVENTOR.
*Frederick C. Melchior*
BY
*Munn, Liddy & Glaccum*
*Attorneys*

May 29, 1956 F. C. MELCHIOR 2,748,217
ALTITUDE SWITCH
Filed Aug. 2, 1951 2 Sheets-Sheet 2
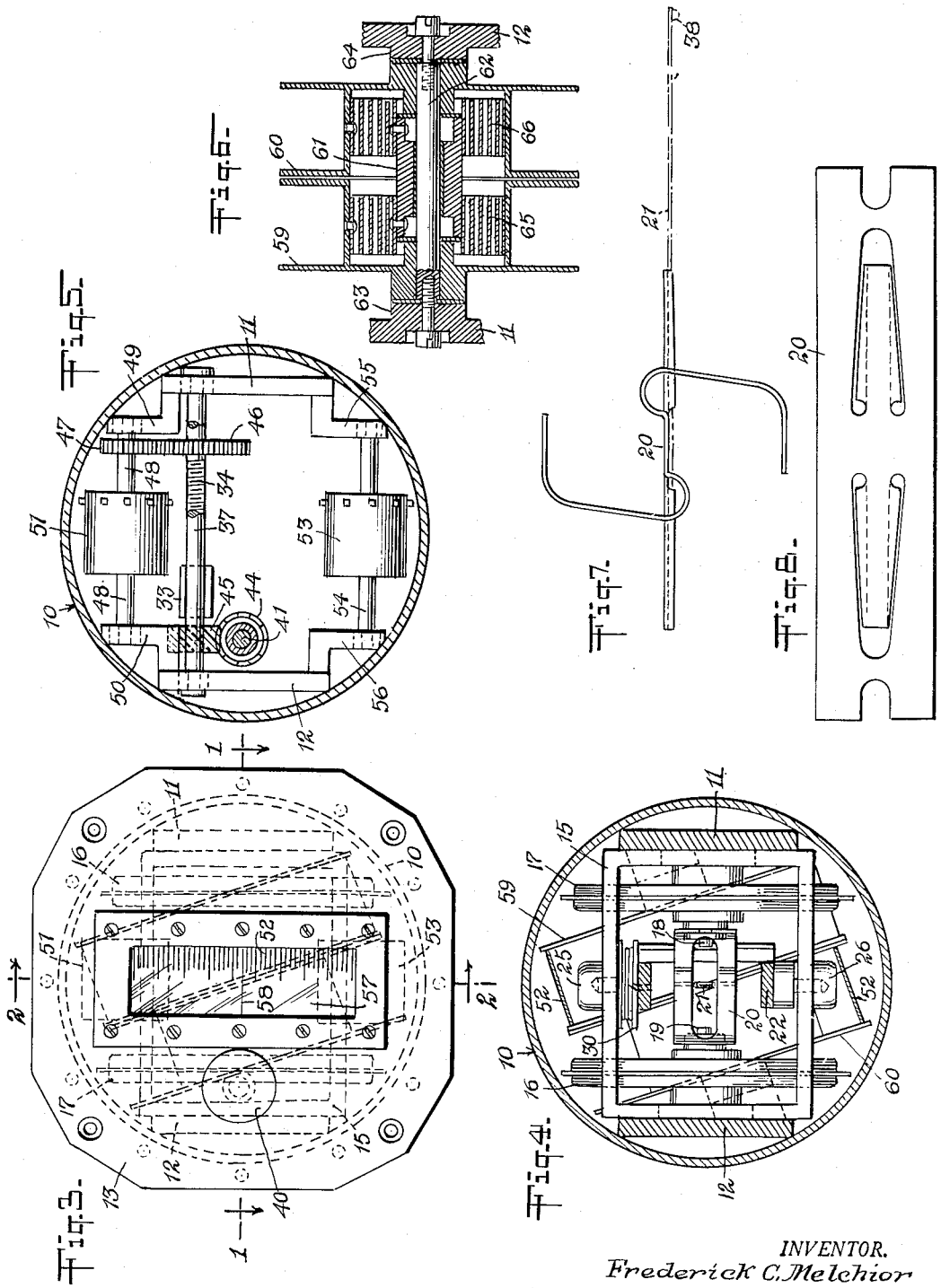
INVENTOR.
Frederick C. Melchior
BY
Munn, Liddy & Glaccum
Attorneys

United States Patent Office 2,748,217
Patented May 29, 1956

2,748,217

ALTITUDE SWITCH

Frederick C. Melchior, New York, N. Y.

Application August 2, 1951, Serial No. 239,993

7 Claims. (Cl. 200—83)

This invention relates to sensitive instruments which are adapted to control other instruments, devices or machines in automatic response to certain stimuli or conditions and to indicate such control process and its status to an observer.

The invention relates to instruments particularly of the pressure sensitive variety in which the motion of capsules, bellows or other actuating element registers a given pressure and/or related factors, such as altitude, by means of a suitable mechanism transmitting such motion. More particularly, it relates to the type of instrument in which the sensitive actuating element may be caused to perform a given function, such as closing or energizing an electric circuit, when a certain pressure or altitude for which the instrument has been set is attained. Such uses may be manifold, and the scope of this invention may well cover a number of commercial as well as military applications. However, specific reference is here made to an altitude switch, the prime purpose of which is to function as a trigger for detonating bombs and other missiles of the nuclear type at desired altitude with a reasonable degree of accuracy.

It is now common knowledge that whereas conventional "air-to-ground" and "ground-to-ground" bombs and missiles are ordinarily made to explode upon impact, the atomic bomb of the "air-to-ground" variety has one ideal altitude for a given magnitude of power, this being the height above the target where adequate destructive power is delivered to the maximum area encompassed by the effective angle. If the bomb is set off much above this altitude, too much of its power is dissipated in the atmosphere and not enough on the object, whereas much below such altitude the area within the effective angle diminishes rapidly to the detriment of area bombing efficiency. Hence, a reasonable accuracy should obtain; and, while it may not be too critical in terms of minute quantities, it should be borne in mind that overall accuracy, or, say, total error, is almost always compounded of a number of factors, some of which may occasionally cancel out but must nevertheless be considered in their potentially worst combination as conducive to maximum total error. As some of these factors cannot be controlled, it is only axiomatic that those which can be should be reduced to an absolute minimum.

One object of the invention is to produce an instrument of optimum accuracy by unloading the pressure sensitive elements of any and all work, such as is normally inherent in the operation of an indicating mechanism, and by shielding them against pressures or altitudes beyond the required operating range, thus limiting their motion to such range and substantially preventing the occurrence of hysteresis which tends to increase at an accelerated rate as maximum deflections are approached.

Another object of the invention is to obtain practically infinite sensitivity by elimination of all friction in the operation of the actuating mechanism and in the transmission of its motion to a registering or indicating device, thus not only augmenting the overall accuracy, but also substantially eliminating lag in its response to and accurate indication of pressure changes, even under conditions of extreme rate of change.

A further object of the invention is to provide for required scale expansion over the entire operating range of the instrument, so as to obtain desired readability together with the accuracy of custom calibration, and thus to render possible most precise setting of the instrument for any given pressure or altitude dictated by prevailing conditions.

A still further object of this invention is to obtain absolute reliability, through simple and efficient design confining the entire function to be performed by this instrument exclusively to the operation of the actuating mechanism itself, thus avoiding any and all extraneous elements, components or accessories conducive to errors and possible mechanical failures.

Additional objects as well as the exact nature and scope of the invention will be understood from the accompanying drawings illustrating the various details of apparatus for carrying the invention into effect, as hereinafter described in this specification.

Referring now to the said drawings—

Fig. 1 is a longitudinal view showing the case in section;

Fig. 2 is a transverse section (at 90 degrees to Fig. 1) showing portions of the structure broken away;

Fig 3 is a face or front view of the instrument;

Fig. 4 is a section on the line 4—4 of Fig. 2;

Fig. 5 is a section on the line 5—5 of Fig. 2;

Fig. 6 is a detail section of the (scale storage) reels;

Fig. 7 is a detailed (side) view of the spring flexure movement mounting a contact arm;

Fig. 8 is a blank of the spring flexure movement before it is bent into shape.

As may be seen from the drawings, the instrument here chosen to illustrate my invention embodies operating and structural features somewhat similar to those described in my previous applications Ser. No. 702,665 and Ser. No. 770,744, now Patent Nos. 2,603,728, issued July 15, 1952, and 2,656,721, issued October 27, 1953, respectively, with certain new and important improvements and inventive features added. While the particular purpose of the invention, as herein set forth, is of prime consideration, its usefulness may well extend to other applications where the same requirements prevail. One such example, and probably the best one, would be that of an aircraft landing altimeter, where the principal use is confined to the proximity of ground level and, consequently, justifies a relatively limited range of operation. The invention should, therefore, not be limited to any one specific application, but should rather be allowed to extend in scope to any and all uses where the aforesaid requirements and desiderata may apply.

Referring now to Figures 1 and 2, we find a conventional case 10 housing a rigid structure consisting of two longitudinal members 11 and 12 rigidly affixed by accepted methods and means, such as standard machine screws, to the face or front plate 13 and further reinforced and accurately spaced by the bottom plate 14 and the central frame 15 to which they are, likewise, rigidly affixed by means of conventional precision machine screws. On each of the members 11 and 12 is mounted one of two pressure sensitive capsules 16 and 17 in a manner so that they are facing each other and have a common axis. The front buttons of these capsules have integral, threaded studs 18 and 19 onto which is bolted a one-piece spring flexure movement 20, shown in enlarged detail in Fig. 7 as mounting a contact arm or lever 21 which may well be spot-welded to the straight center portion of the spring flexure movement 20. The latter is blanked out from a single piece of spring metal strip, as shown in Fig. 8, whereupon it is bent into shape, as clearly indicated in Fig. 7, and finally heat treated for best spring properties it being understood that the outer portion of the blank 20 is bent to form the capsule contact members while the inner portion, or cut out portion, is allowed to remain in the vertical to contact the lever bearing element 21. This one-piece construction results in a superior spring movement, as it prevents any possibility of lost motion which might well occur in an assembly of multiple components; moreover, its lighter weight materially reduces position error, and it is also very much easier and cheaper to manufacture. When the spring flexure movement 20 is mounted in position on the capsule studs 18 and 19, the assembly forms a reciprocating linkage in which the straight center portion of the spring flexure movement 20 with its contact arm 21 becomes a floating lever which pivots about a theoretical fulcrum with an axis at ninety degrees to that of the capsules 16 and 17, and to that of the case 10 as well, as the capsules expand or contract with increasing or decreasing altitude. Here the said lever is shown in a central or mid-position representing about the half-way mark of expansion of the capsules for the particular operating range which may apply. As aneroid capsules expand with increasing altitudes, they will push on the lever 21 and tilt it toward the capsule 17, whereas with decreasing altitude—being further compressed—they will pull on the lever and thus tilt it toward the capsule 16. Inasmuch as this motion takes place by way of mere deflection of spring metal, without bearings or pivots, it is obvious that the operation of the pressure sensitive actuating mechanism is totally frictionless.

Again, in Figs. 1 and 2 we note a yoke or cradle 22 pivotally suspended with its shaft studs 23 and 24 in miniature ball bearings 25 and 26 in the mounting bosses 27 and 28 which in turn are solidly mounted in the central frame 15. The said bosses have a thin inside plastic lining insulating the ball bearings, and thereby the cradle 22, from electrical contact with the frame structure. Likewise insulated is the coil spring 29 on the plastic hub 30, one end of the said spring being lodged in the cradle 22 and the other in an insulated metal insert 31 in the central frame 15. The spring 29 exerts a light pressure on the cradle 22 against the hardened steel pin 32 in the nut 33 on the lead screw 34 suspended in the ball bearings 35 and 36 which in turn are mounted with a press fit in the members 11 and 12. The lead screw 34 has a fine thread—say, seventy-two to the inch—ground without tolerances and matched with that of the nut 33 by means of a special burnishing process insuring a lifetime job without play or back-lash.

The cradle 22 may be chrome plated so as to minimize friction and wear as it rides on the hardened and polished steel pin 32 which is seated with a press fit in a thin insulating liner of fiber or plastic in the nut 33, the open end of which embraces a guide post or pillar 37 rigidly mounted by means of conventional precision shoulder screws in members 11 and 12 and in a manner so as to line up perfectly with the lead screw 34. Thus it is evident that when the lead screw is rotated the nut travels straight in a plane common to the axis of the post 37 and the lead screw 34. As the cradle 22 is spring loaded against the pin 32, it is also obvious that back and forth travel of the nut 33 on the lead screw 34 will cause the cradle 22 to follow by pivoting back and forth in ball bearing 25 and 26, about an axis and in a plane identical with the axis and plane of the pivotal motion of the contact lever 21, the extreme end of which is equipped with a small rivet 38 with a semi-spherical contact surface of noble metal, such as a platinum-iridium alloy, located at a radial distance to correspond with a similar rivet 39 with a flat and somewhat larger contact surface, which is fixed to the cradle 22 and centered on the same arc of a circle as the contact rivet 38. Consequently, the two rivets 38 and 39 can be brought into contact with each other anywhere within the operating range of the instrument, either by a change in pressure causing the contact lever 21 to move toward the cradle, or by operation of the cradle by way of the nut 33 and the lead screw 34, in a manner as hereinafter described.

On the face plate 13 we find a manual knob 40 with its integral shaft 41 seated with a lapped fit in an airtight flanged bushing 42 and extending into the case to the bearing support sleeve 43. Between the said sleeve and the end of the bushing 42 the shaft 41 mounts a helical gear 44 which engages a similar helical gear 45 on the near end of the lead screw 34. By these means the said lead screw may be rotated by manually turning the knob 40.

Mounted on the far end of the lead screw 34 is a pinion or spur gear 46 engaging a similar but smaller pinion 47 fixedly mounted on the sprocket shaft 48 which is rotatably suspended in the bearing lugs 49 and 50 on the central frame members 11 and 12. The sprocket spool 51 is fixed on the shaft 48 and is of the standard type used in certain cameras and motion picture projectors to propel the film, its function here being somewhat similar in that the subject instrument has a movable scale in the form of a tape 52 which may well consist of standard motion picture film of the acetate type, as this is easy and inexpensive to obtain and offers distinct advantages for this particular use. As may be seen from Figs. 2 and 5, a second and identical sprocket spool 53 is mounted in the same manner, abreast of and parallel with the sprocket spool 51, on its shaft 54 which is rotatably suspended in the bearing lugs 55 and 56 on the central frame 15; however, it is also seen that the shaft 54 has no gear or other drive, as the sprocket spool 53 is merely an idler which, together with the propelling sprocket spool 51, guides the tape scale 52 as close to the window 57 as possible, so that scale divisions and numbers may be read with negligible parallax by means of a hairline 58 in the under surface of the window.

In order to obtain desired scale length, which must be continuous so as to permit of custom calibration, I have devised a simple, compact and efficient arrangement which is clearly indicated in Figs. 1 and 2. In the rear portion of the structure are found two storage reels 59 and 60 and between them a free floating hub 61, as shown in Fig. 6, all free to rotate together as a unit on the shaft 62 which is fixedly mounted on the lugs 63 and 64 on the longitudinal members 11 and 12. It should be noted, however, that relative motion between the said reels is limited and governed by the clock springs 65 and 66 and the tape scale 52 in a manner that becomes quite obvious if one keeps in mind that the springs 65 and 66 are installed so as to oppose each other, their outer ends being attached by suitable means, such as rivets or slots, to the reel bodies, and their inner ends likewise to the ends of the hub 61. Correct installation of the reels 59 and 60 and the tape scale 52 will thus cause the springs 65 and 66 to keep the tape 52 taut around the sprocket spools 51 and 53 at all times; at the same time they will provide ample latitude in compensating for the variation in diameters as one reel gives off tape and the other one takes it on, it being noteworthy that the reels always turn together in the same direction, and that minimum spring tension is obtained at mid-position when both reels hold the same amount of tape— maximum tension being attained at either end, when one reel is full and the other one empty. It is also relevant to note that by mounting the shaft 62 at a slight angle to, rather than parallel with, the shafts 48 and 54, the feeding and receiving side of each reel is brought into substantially perfect alignment with its particular communicating sprocket spool.

From the foregoing it is now obvious that rotation of the lead screw 34 will also cause rotation of the shaft 48 by way of the pinions 46 and 47, thus causing the sprocket spool 51 to propel the tape scale 52 at a proportional rate and in a manner that it winds off one reel and onto the other. The only effort expended in such propulsion is the sum of a rather negligible rotational friction and the slightly increasing tension in the springs 65 and 66, the latter force occurring only when motion proceeds from mid-position to either end of the travel. Moreover, it is an extremely small force, as it is effected through a very slow and gradual reciprocal change in the aforesaid relative diameters of the reels 59 and 60. Obvious is also the fact that inasmuch as the sprocket propelled tape 52 is geared to the lead screw 34, its motion is thereby perfectly synchronized with that of the cradle 22, which means that for any one position of the cradle there is a given point on the tape conforming with the hairline 58, and this coincidence exists for any and all points over the entire range, with constant and perfect repeatability.

We have previously shown how the rivets 38 and 39 on the lever 21 and the cradle 22 may be brought into contact with each other anywhere on their common arc within the operating range of the instrument as expressed by capsule motion and lever magnification. Assuming the product of these factors to result in a maximum projected travel of the nut 33 on the lead screw 34 of one and one-eighth of an inch, and the gear ratio between the lead screw and the sprocket spool 51 to be two to one—the diameter of the latter being three-quarters of an inch—then the total scale length for such maximum range of motion becomes about 360 inches, which is well within the limit of the amount of tape that can be accommodated in the size of instrument suggested in the drawings.

We have also shown that, whereas the contact lever 21 is naturally grounded in the frame structure of the instrument, the cradle 22 is insulated from electrical contact with the said structure and is instead connected to the terminal 67 by way of the spring 29, the insulated metal insert sleeve 31, the lead wire 68, the insulated male plug 69 in the bottom plate 14, the double female plug socket 70 cemented airtight in the separation wall 71 of the case 10, and the male plug 72 which forms part of the terminal 67 in the bottom cover plate 73 of the case 10. Similarly, the contact lever 21 is connected to the terminal 74 by way of the frame structure, the male plug 75, the double-end female plug socket 76 and the male plug 77 of the terminal 74. Thus, by connecting the terminals 67 and 74 to a circuit that will signal contact between the rivets 38 and 39, the tape 52 may be calibrated increment by increment over the entire scale range against a suitable master.

By the same token it is obvious that the instrument so calibrated may be operated in a manner as previously described to determine ambient pressure or altitude, the correct value appearing against the hairline 58 when the signal is obtained by the cradle rivet 39 contacting the lever rivet 38; and, conversely, the instrument may be set with its scale for a given pressure or altitude, responding when such value is reached by closing the circuit as the lever rivet 38 contacts the cradle rivet 39. From this it is evident that the pressure sensitive assembly is in effect a self-contained actuating unit; hence, the instrument itself is actually the switch, a pressure or altitude operated switch with optional range for most precise setting and optimum overall accuracy.

Referring now again to Figs. 1 and 2, we find in the rearmost compartment of the case 10 a third capsule 78 mounted on the bottom cover plate 73. The front stud 79 of this capsule is made into a valve stem with a semispherical or cone shaped head to provide an airtight fit against the valve seat 80 in the special fitting 81 which is cemented with a taper thread fit into the separation wall 71 of the case 10. In the cover plate 73 is a standard pressure fitting 82 with ¼ x ⅛ inch taper thread for standard tube connection with an outside static tube, whereby outside ambient pressure is communicated to the case 10 which is sealed airtight. Inasmuch as the capsule 78 is also of the aneroid type and designed for the full atmospheric pressure range, it will expand and contract with increasing and decreasing altitude in the same manner as the capsules 16 and 17, causing back and forth movement of the valve stem 79 into and out of the valve seat 80, as dictated by the pressure changes. Thus, at relatively low altitudes air will be free to pass into and out of the main compartment of the case 10 so as to maintain outside ambient pressure on the capsules 16 and 17 to cause them to operate in response to such pressure changes in a manner as previously described. On the other hand, when a certain altitude—say, 15,000 feet—is reached, the capsule 78 will have expanded to a point where the valve stem 79 buts against the valve seat 80, seating itself with increasing force as higher altitudes are attained and thereby sealing off the capsules 16 and 17 from exposure to the lower pressures at altitudes above their required operating range. In this manner their deflection would be limited to about half of what it would be at 45,000 feet without such protection which is fully automatic, so that below the suggested altitude of 15,000 feet the capsule 78 will again open up the air passage and allow ambient pressures to govern the operation of the capsules 16 and 17.

While, unquestionably, it is here quite easy to visualize simple means for adjusting the opening and closing of the valve stem 79 for different pressures or altitudes— for example, by turning the whole capsule 78 in a finely threaded suspended boss, or by threading the stem 79 as a separate part onto the stud of the capsule button—it should be noted that the particular altitude desired for the opening and closing process is not critical. Inasmuch as the prime purpose is to improve accuracy, where a limitation to capsule deflection of about 50% would substantially eliminate hysteresis error—it is believed that a rigid installation to approximate the required range with a safe margin for each particular use would be preferable in the interest of reliability.

Considering now the objects of the invention, it may be of interest to note how and to what extent the aims and requirements hereinbefore set forth have been met.

As has been clearly shown, the pressure sensitive actuating mechanism is a self-contained assembly completely divorced from the indicating mechanism, its sole function being to operate the lever 21 in cooperation with the cradle 22 for contact between the rivets 38 and 39, when required; consequently, it is not handicapped by any kind of work, as in conventional designs where this constitutes a drag that impedes the accurate response of the pressure sensitive elements. Moreover, as the capsule 78 protects the capsules 16 and 17 from exposure to pressures or altitudes beyond their required operating range, and thereby from unnecessary deflection, hysteresis error is reduced to insignificance.

Equally obvious is the fact that the floating lever 21, as an integral part of the unit reciprocating linkage, is operated by way of deflection in the spring metal, in the capsules 16 and 17 and in the spring flexure movement 20 as well. The consequent absence of friction, inevitably encountered in any and all types of bearings, has produced an entirely new concept of sensitivity.

In an earlier chapter it was indicated that a continuous, custom calibrated scale length of 360 inches could easily be accommodated in the size of instrument (standard aircraft panel size) suggested in the accompanying drawings. Applied to a range of about 15,00 feet, there would be an average of approximately 0.25 of an inch of scale length for every 10 feet of altitude, which is roughly three times that obtained in the present multi-revolution type of altimeter which cannot be custom calibrated and, therefore, is not to be spoken of in terms of accuracy. The precision with which the subject instrument may be set is now quite obvious.

Finally, it has been conclusively shown that the entire operation of the subject instrument as a switch is confined to the main operating parts of its structure, in that it is the contact lever 21, as an integral part of the pressure sensitive actuating mechanism, that closes the circuit by contacting the cradle 22 of the precision operated indicating mechanism. Consequently, the instrument itself is the switch, and there are no extraneous elements, components or accessories, which are most frequently conducive to errors and/or outright mechanical failures.

Now a word regarding ultimate reliability or possible operational failure. The only such failure that could be visualized as reasonably possible in the structure hereinbefore described is that of a capsule leak, which in a carefully tested and seasoned instrument is so remote that the chance may well be discontinued. If, nevertheless, such a think should happen, it would result in a failure to activate the trigger mechanism and not in a premature detonation. This is readily understood when it is pointed out that a leak in any one of the capsules would cause it to expand and thus to prevent the lever 21 from making contact with the cradle 22, or to at least substantially delay such action.

In order to provide complete insurance against such a remote, last minute contingency, two of the subject instruments may well be used in parallel without any complications thereby being introduced into the installation.

I claim:

1. An instrument of the character described including a casing having an air-tight chamber therein, a pair of pressure capsules mounted in said air-tight chamber and connected by a flexure movement, a lever on said flexure movement, a cradle pivotally mounted and adapted to be positioned by means outside of said air-tight chamber for contact with said lever to close a circuit, a valve in said air-tight chamber communicating with a chamber open to the atmosphere and a pressure sensitive capsule controlling said valve.

2. An instrument as set forth in claim 1 wherein said flexure member is made of a single piece of material cut and bent upon itself to form a pair of capsule engaging arms and a lever carrier at substantially right angles to said capsule engaging arms.

3. An instrument of the character described including a casing having an air-tight chamber, pressure sensitive capsules mounted in said chamber, a flexure member connecting said capsules, a lever on said flexure member, a cradle pivotally mounted in said chamber with a spring urging said cradle towards said lever, means operable from without said chamber to position said cradle, a pair of sprockets, a tape running over said sprockets and engaged thereby, gear means synchronizing the movement of said tape with the movement of said cradle, a pair of storage drums for said tape, spring means to keep tension on said tape, a second chamber in the lower part of said casing communicating with the atmosphere, a valve between said second chamber and said air-tight chamber and a pressure operated capsule in said chamber to open and close said valve.

4. An instrument of the character described including an air-tight casing having an opening therein, a metal frame within said casing, a plurality of pressure sensitive capsules mounted on said frame and connected by a flexure member, a contact lever on said flexure member the movement of which is controlled by the expansion or contraction of said capsules, a cradle pivotally mounted in said frame but insulated therefrom, a spring urging said cradle toward said lever, means operable from without the casing to selectively position said cradle, electrical contact means insulated from said frame but engaging said spring and electrical contact means engaging said frame whereby when said lever due to the contraction or expansion of said capsules is moved into contact with said cradle the circuit is closed.

5. An instrument as set forth in claim 4 in which said opening communicates with a chamber by means of a valve, and a pressure sensitive capsule in said chamber to control said valve.

6. A flexure member for use with opposing capsules and a lever wherein the flexure member is made of a single piece of material with two center portions cut to form a vertical lever carrying portion and the outer portions are bent upon themselves to form capsule engaging arms.

7. A flexure member for use with opposing capsules and a lever wherein the flexure member is made of a single piece of material with two center portions cut to form a vertical lever carrying portion and the outer portions are bent upon themselves to form capsule engaging arms, each of said arms being substantially at right angles to said lever carrying portion and having its end section substantially parallel to said lever carrying section and having means thereon to engage said opposing capsules.

References Cited in the file of this patent

UNITED STATES PATENTS

| | | |
|---|---|---|
| 1,749,494 | Luckey | Mar. 4, 1930 |
| 2,027,088 | Carbonara | Jan. 7, 1936 |
| 2,092,522 | Post | Sept. 7, 1937 |
| 2,324,654 | Tinnerman et al. | July 20, 1943 |
| 2,362,869 | Wade | Nov. 14, 1944 |
| 2,366,146 | Martin-Hurst | Dec. 26, 1944 |
| 2,366,897 | Grooms | Jan. 9, 1945 |
| 2,458,022 | Phelps et al. | Jan. 4, 1949 |

FOREIGN PATENTS

| | | |
|---|---|---|
| 543,922 | Great Britain | Mar. 19, 1942 |